(12) United States Patent
Saft et al.

(10) Patent No.: US 8,255,795 B2
(45) Date of Patent: *Aug. 28, 2012

(54) OPTIMAL VIEWING OF DIGITAL IMAGES AND VOICE ANNOTATION TRANSITIONS IN SLIDESHOWS

(75) Inventors: Keith Saft, San Francisco, CA (US); Matthew W. Crowley, Los Altos, CA (US); Yingfeng Su, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

This patent is subject to a terminal disclaimer.

(21) Appl. No.: 12/534,059

(22) Filed: Jul. 31, 2009

(65) Prior Publication Data
US 2010/0013861 A1    Jan. 21, 2010

(51) Int. Cl.
*G06F 17/00* (2006.01)
(52) U.S. Cl. ........ 715/239; 715/209; 715/275; 715/211; 715/210; 715/243
(58) Field of Classification Search .............. 715/239, 715/209, 275, 211, 210, 243
See application file for complete search history.

(56) References Cited

U.S. PATENT DOCUMENTS

| | | | |
|---|---|---|---|
| 6,222,944 B1* | 4/2001 | Li et al. ................ 382/250 |
| 6,337,688 B1* | 1/2002 | Berstis ................ 345/473 |
| 6,910,182 B2 | 6/2005 | Huang |
| 6,976,226 B1 | 12/2005 | Strong et al. |
| 2001/0014126 A1* | 8/2001 | Nishizawa et al. ...... 375/240.25 |
| 2001/0032217 A1* | 10/2001 | Huang ................ 707/513 |
| 2002/0057281 A1* | 5/2002 | Moroo et al. .......... 345/668 |
| 2002/0135678 A1* | 9/2002 | Bacus et al. .......... 348/143 |
| 2003/0160890 A1* | 8/2003 | Caspe et al. .......... 348/372 |
| 2003/0206729 A1* | 11/2003 | Loui et al. ............. 386/125 |
| 2003/0231190 A1* | 12/2003 | Jawerth et al. ........ 345/660 |
| 2004/0114904 A1* | 6/2004 | Sun et al. ............. 386/46 |
| 2004/0133927 A1* | 7/2004 | Sternberg et al. ...... 725/136 |
| 2004/0143590 A1* | 7/2004 | Wong et al. .......... 707/102 |
| 2004/0190874 A1* | 9/2004 | Lei et al. ............. 386/111 |
| 2004/0208377 A1* | 10/2004 | Loui et al. ............ 382/224 |
| 2005/0091576 A1* | 4/2005 | Relyea et al. ......... 715/502 |
| 2005/0132288 A1* | 6/2005 | Kirn et al. ........... 715/700 |
| 2005/0149598 A1* | 7/2005 | Mendlovic et al. ..... 708/816 |
| 2005/0206657 A1* | 9/2005 | Arcas ................ 345/660 |
| 2005/0251331 A1* | 11/2005 | Kreft ................. 701/207 |
| 2005/0270299 A1* | 12/2005 | Rasmussen et al. ..... 345/552 |
| 2005/0270311 A1* | 12/2005 | Rasmussen et al. ..... 345/677 |
| 2005/0286421 A1* | 12/2005 | Janacek .............. 370/231 |
| 2006/0037990 A1* | 2/2006 | Geise ................ 228/101 |

(Continued)

OTHER PUBLICATIONS

Zhang, H., "Adaptive Content Delivery: A New Application Area for Media Computing Research," Jan. 2000, [Online] [Retrieved on Nov. 12, 2005] Retrieved from the Internet<URL:http://research.microsoft.com/research/pubs/view.aspx?pubid=905>.

(Continued)

*Primary Examiner* — Cesar Paula
*Assistant Examiner* — Nathan Hillery

(57) ABSTRACT

A system and a method are disclosed for optimally viewing a non-square aspect ratio photo or video within a non-square aspect ratio display area of a screen. In addition, a system and a method are disclosed for positioning and storing a reference point (e.g., a relative center point) of an image within a display area of a screen. Further, in a slideshow configuration, a system and a method allows for transition between images using sound annotations associates with a particular image.

15 Claims, 11 Drawing Sheets

U.S. PATENT DOCUMENTS

| | | | | |
|---|---|---|---|---|
| 2006/0041632 A1* | 2/2006 | Shah et al. | | 709/217 |
| 2006/0170693 A1* | 8/2006 | Bethune et al. | | 345/568 |
| 2006/0178140 A1* | 8/2006 | Smith et al. | | 455/427 |
| 2006/0264209 A1* | 11/2006 | Atkinson et al. | | 455/422.1 |
| 2007/0014488 A1* | 1/2007 | Chen et al. | | 382/294 |
| 2007/0047101 A1* | 3/2007 | Aguera Y Arcas | | 359/689 |

OTHER PUBLICATIONS

"iView Media™ Pro™ 2—Media Management Made Easy," Manual Version 2.6, Sep. 2004, iView Multimedia Limited, 100 pages.

"ArcSoft PhotoBase™ Mobile Edition," ArcSoft, 2 pages.

"ArcSoft PhotoBase™ Mobile Edition for Brew User's Guide," ArcSoft, Inc., 2003, 11 pages.

"ArcSoft PhotoBase™ Mobile Edition for Series 60 2.00 User's Guide," ArcSoft, Inc. 2003, 14 pages.

"Series 60 Platform," found at URL: http://www.series60.com/applications?action=showNewsArticle&newsID=156&hot=1&pbld=83, retrieved from the internet on Sep. 15, 2005.

Office Actin mailed Nov. 14, 2007, issued in related U.S. Appl. No. 11/132,072, filed May 17, 2005.

Office Action mailed May 16, 2008, issued in related U.S. Appl. No. 11/132,072, filed May 17, 2005.

Advisory Action mailed Aug. 13, 2008, issued in related U.S. Appl. No. 11/132,072, filed May 17, 2005.

Office Action mailed Jan. 5, 2009, issued in related U.S. Appl. No. 11/132,072, filed May 17, 2005.

Notice of Allowance mailed May 29, 2009, issued in related U.S. Appl. No. 11/132,072, filed May 17, 2005.

* cited by examiner

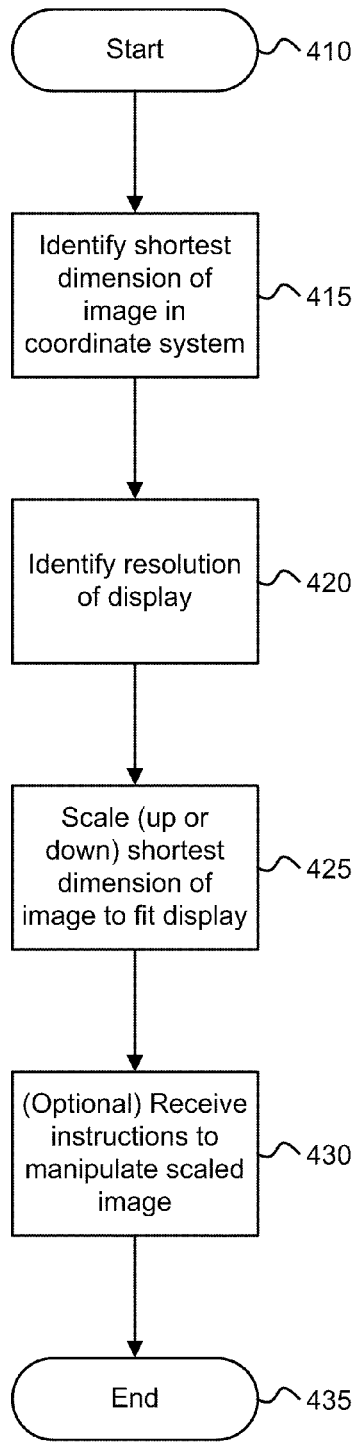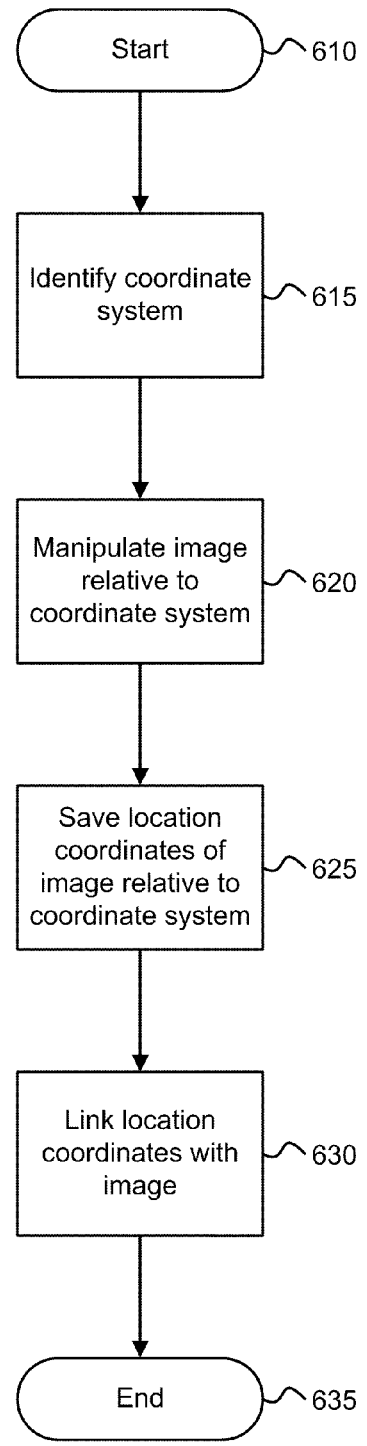
FIG. 4
FIG. 6

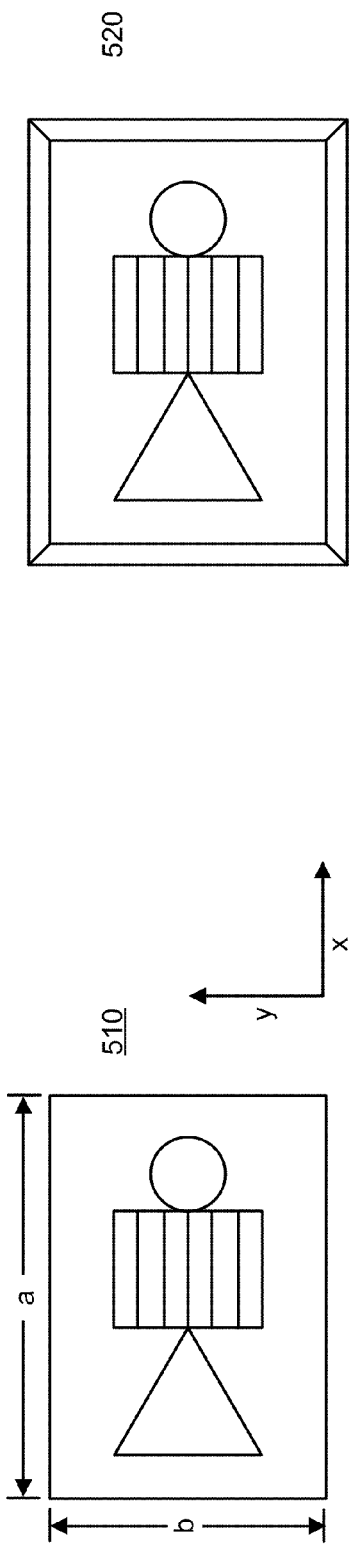
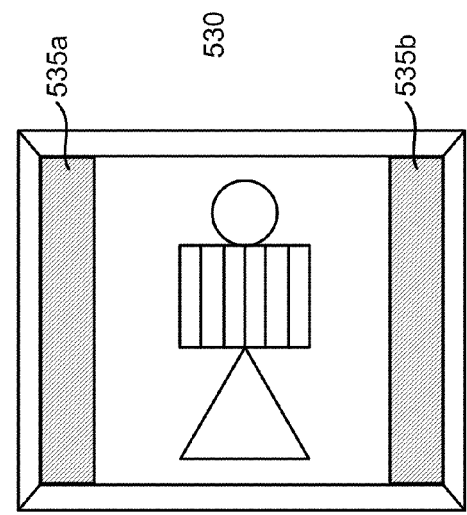
FIG. 5a
FIG. 5b
FIG. 5c

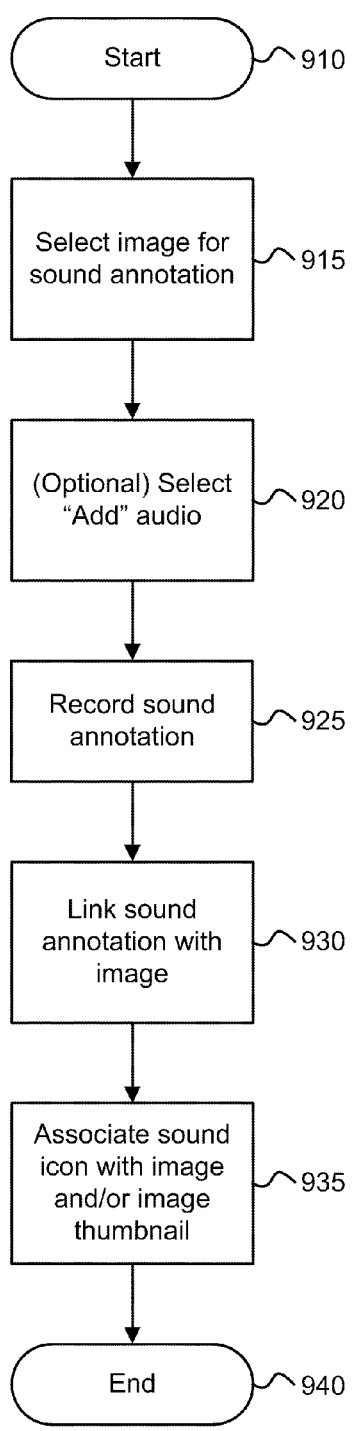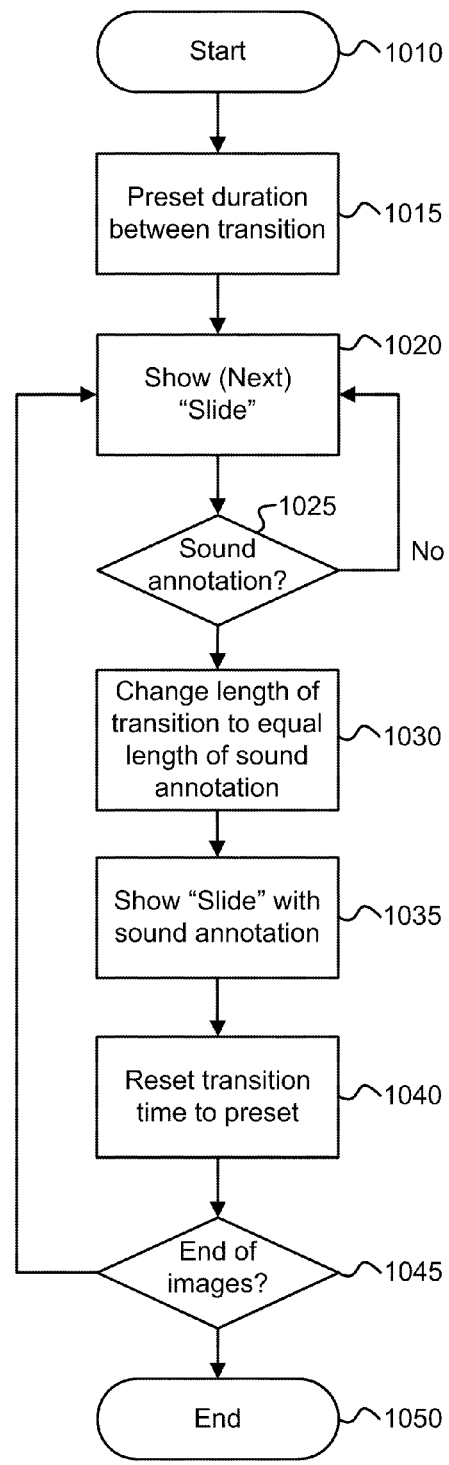
FIG. 9a
FIG. 10

OPTIMAL VIEWING OF DIGITAL IMAGES AND VOICE ANNOTATION TRANSITIONS IN SLIDESHOWS

CROSS REFERENCE TO RELATED APPLICATIONS

This application is a continuation of U.S. patent application Ser. No. 11/132,072, filed on May 17, 2005, the contents of which are hereby incorporated by reference in its entirety.

BACKGROUND

1. Field

The present invention relates to viewing of digital images, and more specifically, to optimal viewing of digital images, including repositioning of images, relative to an available display area of a screen. The present invention also relates to use of voice annotation times to transition between digital images arranged in a slideshow.

2. Description of Related Art

Viewing of images (e.g., photo or video) on display devices such as computing systems, personal digital assistants (PDAs), camera phones, and digital cameras, is well known. When images are selected for viewing, a user is forced to view the images in the pre-configured orientation of the particular display, regardless of what may be the configuration of the image. For example, most lap screens are landscape configurations. In such configurations landscape images are appropriately displayed to fit the screen. In contrast to landscape images, portrait images are automatically cropped at the sides, e.g., with black bars, of the display area on the laptop screen.

For devices with portrait displays, for example, PDAs or camera phones, the opposite problem is present. In particular, portrait images are properly displayed but landscape images are cropped at the top and bottom, e.g., with black bars, of the display area of the portrait screen. These conventional systems all limit the enjoyability of viewing images not optimized for the display area of the screen.

Conventional systems can also be used to move images around relative to a screen. However, the manipulated image characteristics are not retained by the system upon exiting the view of the image application. Thus, a user is inconvenienced to re-manipulate the image the next time the image is displayed on the screen if the user desires to return to that previous view. Moreover, if the user seeks to make such views as part of, e.g., a slideshow, the user cannot save the views for such purposes. Thus, the user's display options with the image are limited. In addition, conventional solutions typically are a software program that manipulates the image, but serves the manipulated image as a new file that is distinct and apart from the original image file. This causes an increased use of system resources, including processing power and storage space.

In addition, conventional systems allow for display of still images in the context of a slideshow. The slideshow typically has a preset time between image transitions. Any variations in transitions must be entered through a manual process, leaving little to no flexibility in presenting a slideshow. This lack of functionality is particularly problematic where a user may desire to use a digital image characteristic to trigger a transition between digital images in the slideshow.

Hence, there is a need for a system and a process that (1) optimally displays images in a display to cover an entire non-square screen area, (2) manipulate an image on display and save the manipulated image with its characteristics with the same image file for later recall on a screen, and (3) allows for flexibility in manipulating presentation of images in the context of slideshows comprised of two or more digital images.

SUMMARY

An embodiment of the present invention includes a system (and a method) for viewing an image in a manner that covers an entire displayable area of a screen. In one embodiment, the system identifies a resolution of screen to determine shortest and longest dimensions of the screen within a particular coordinate system. The system then identifies a shortest dimension of an image within the particular coordinate system. The system then scales the shortest dimension of the image to fit the shortest dimension of the displayable area of the screen. The remainder of the image is then proportionately fit with respect to the remainder of the displayable area. Thus, the system configures the image to optimize its viewability within the full displayable area of a viewing screen.

Another embodiment of the present invention includes system (and a method) for storing a digital image relative to a reference point of the image presently viewable on a screen. The system determines a coordinate system for use with a display area of a screen and displays a first view of the image followed by a re-positioned (or a new or a second) view of that image. The system identifies coordinates of the reference point within the coordinate system of the display area displaying the second view. In one embodiment, the reference point includes the coordinates of a center of the screen relative to the coordinate system in use. The system then saves the coordinates and associates them with the image. Thereafter, upon recall of the digital image from, for example, a storage device, the system is able to display the image in its re-positioned context (or view).

An embodiment of the present invention is configured to take into account that digital images (including video) oriented as portrait or landscape save separate offset settings. For example, in a portrait orientation, a center point used as the reference point in a digital image is different than a center point used as a reference point in a landscape orientation. Note that in one embodiment, portrait and landscape modes are defined by the device orientation. Further, an embodiment allows for switching between portrait and landscape orientations on a display screen of a device using a physical switch on the device or a soft switch provided through a software configuration.

Yet another embodiment of the present invention allows for taking images, for example, that have been optimized for view in a display area and repositioned in a second view, and integrate them into a presentation format such as a slideshow. In one embodiment, a system (and a method) allows for varying transitions between digital images that are configured for viewing in a slideshow format.

Generally, slideshows are configured to transition from one image to the next in some predetermined time period. An embodiment of the present invention allows for varying those transitions, particularly where sound annotations are associated with an image. In one example, a system applies a time to transition between images for the slideshow format. When playing the slideshow, the system determines whether an image includes an associated sound annotation. In response to the image including a sound annotation, the system alters the time to transition to a subsequent image. The altered time corresponds to a length of the sound annotation. The system then reverts to the applied time to transition in response to the subsequent image lacking a sound annotation. Thus, the system advantageously can vary transitions between images in a slide show by using sound annotations to time such transitions between images that include sound annotations versus images that lack such annotations.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 4 illustrates one embodiment of a process for optimizing a digital image to fill a display area of a screen in accordance with the present invention.

FIGS. 5a through 5d illustrates one embodiment of a photo and corresponding digital image optimized to fill a display area of a screen in accordance with the present invention.

FIG. 6 illustrates one embodiment of a process for saving a new (e.g., second view) of an image for later retrieval with that view in accordance with the present invention.

FIGS. 9a and 9b illustrate one embodiment of a process for annotating a digital image with a sound annotation.

FIG. 10 illustrates one embodiment of a process for transitioning between digital images in a slide show using a sound annotation to transition the digital image.

DETAILED DESCRIPTION

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Example of Handheld Computing Device

Figure 1A:
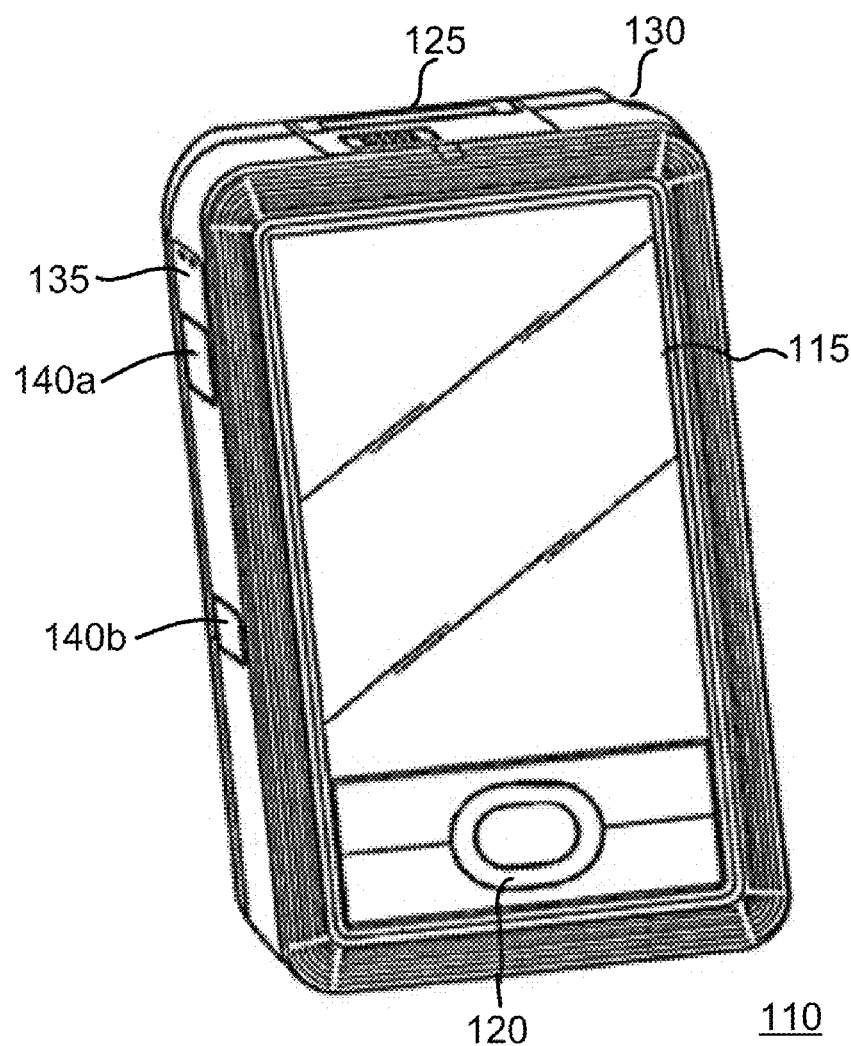
FIG. 1a and 1b illustrate one embodiment of a handheld computing device in accordance with the present invention.
Figure 1B:
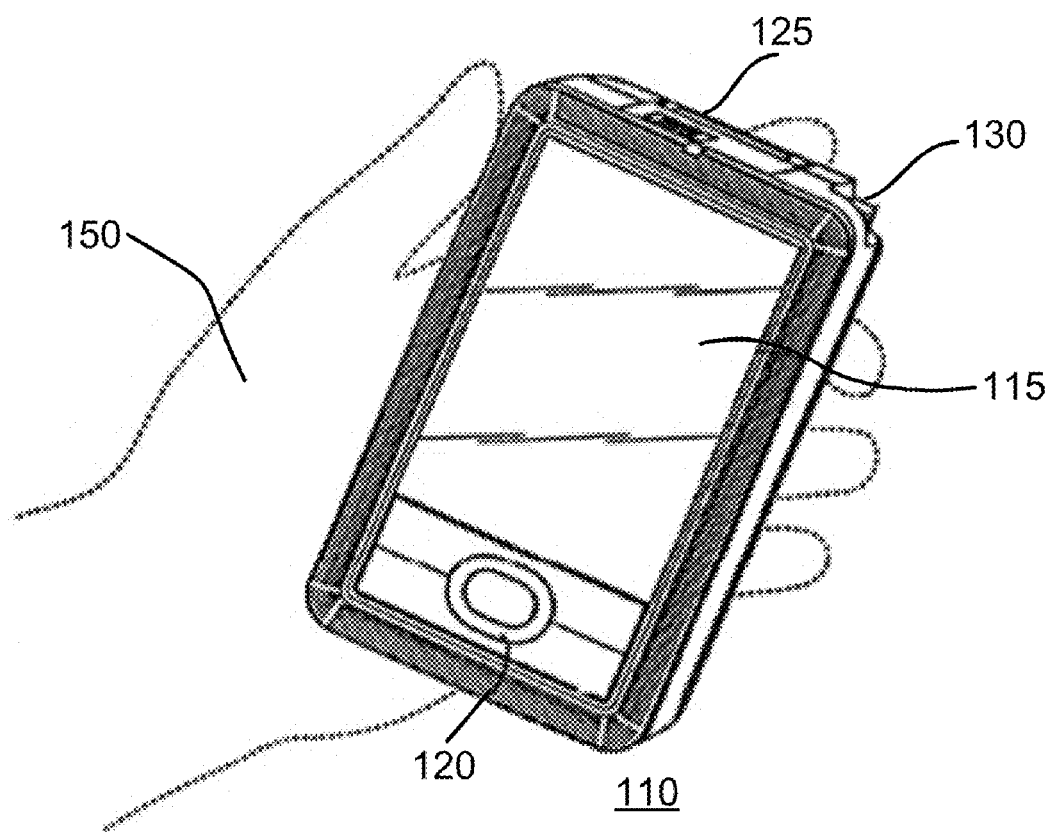

FIGS. 1a and 1b illustrate one embodiment of a handheld computing device 110 in accordance with the present invention. As illustrated in FIG. 1b, the handheld computing device 110 is configured to be of a form factor that is convenient to hold in a user's hand, for example, a personal digital assistant (PDA) or a smart phone form factor. For example, the handheld computing device 110 can have dimensions that range from 3 to 6 inches by 2 to 5 inches by 0.25 to 0.85 inches and weigh between 2 and 10 ounces.

Referring to FIG. 1a, the handheld computing device 110 includes a screen (or display) 115, a screen navigation interface 120, an expansion port (or slot) 125, a stylus 130, a microphone 135, and one or more control buttons, e.g., voice recorder button, screen rotation (or orientation) button, etc., 140a, b (generally 140). The screen is, for example, a 320× 480 transflective TFT color display that includes touch screen support. In the illustrated embodiment, the screen has a non-square area and can be considered a "portrait" view. The expansion slot 125 is configured to receive and support expansion (or media) cards that include memory cards such as CompactFlash™ cards, SD cards, XD cards, Memory Sticks™, MultiMediaCard™, SDIO, and the like. Further, the screen navigation interface 120, the stylus 130, the microphone 135, and the one or more control buttons 140 are conventional, although various functions can be applied to them.

Figure 2:
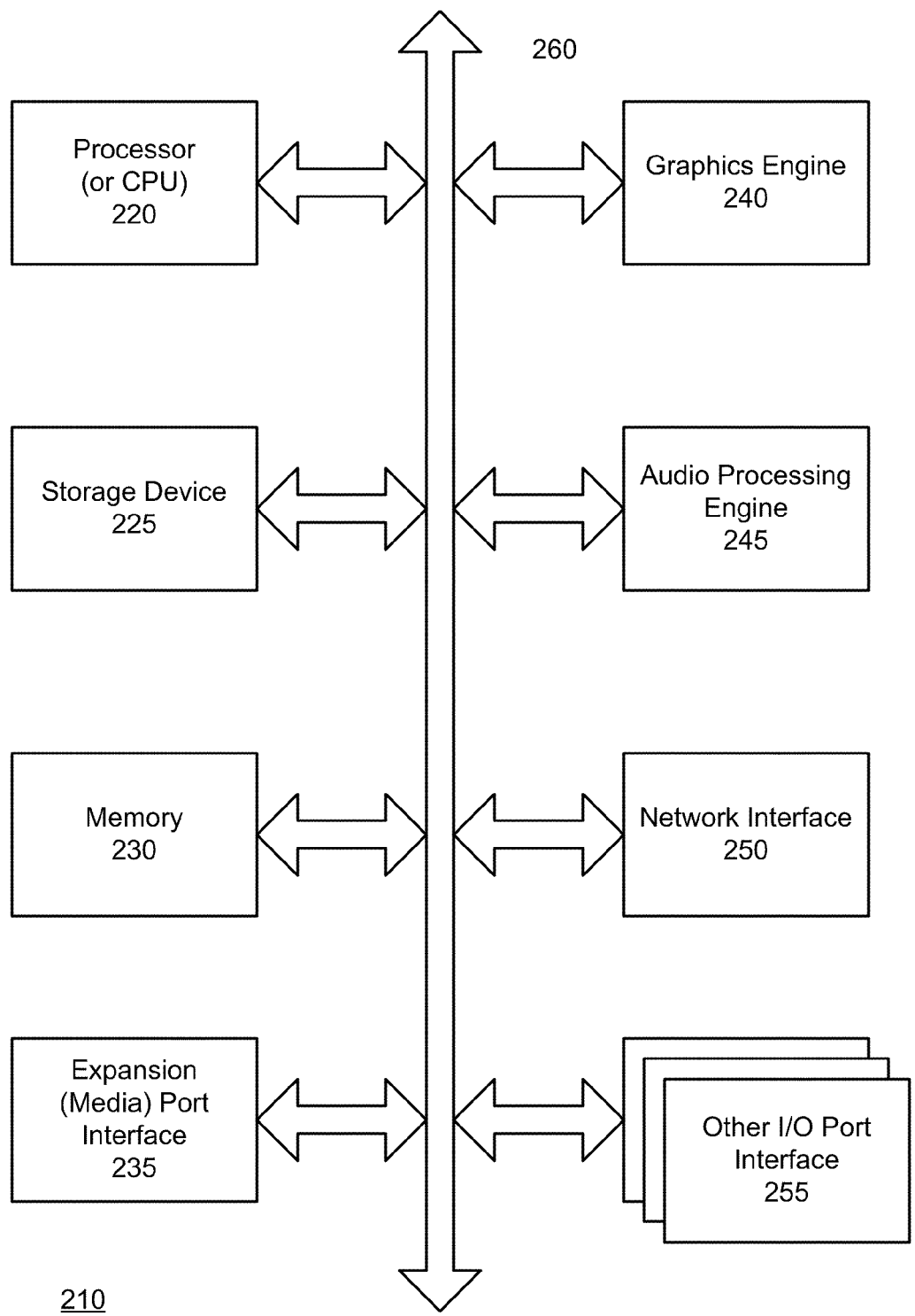
FIG. 2 illustrates one embodiment of a handheld computing device architecture in accordance with the present invention.

Turning to FIG. 2, illustrated is one embodiment of a computing architecture 210 of the handheld computing device 110 in accordance with the present invention. The architecture 210 includes a processor (or CPU) 220, a storage device 225, a memory 230, an expansion (or media) port interface 235, an optional graphics engine 240, an audio processing engine 245, a network interface 250, and one or more other input/output (I/O) port interfaces 255. Each of the components of the computing architecture may communicatively couple through a data bus 260.

The processor 220 is a conventional processor or controller such as an Intel® XScale™ processor. The storage device 225 is a conventional long term storage device, for example, a hard drive (e.g., magnetic hard drive) or a flash memory drive. The memory 230 is a conventional computing memory such as a random access memory (RAM). The expansion port interface 235 is configured to interface with an expansion (or media) card such as the ones previously described. The optional graphics engine 240 may include hardware, e.g., graphics chip, in addition to software to enhance graphics for display on the screen 115.

The audio processing engine 245 is configured for audio related processing such as recording and playback includes appropriate hardware (e.g., microphone, speaker, and/or ports (or jacks) for such connections) and software (e.g., sound controls). The network interface 250 is configured for network connections to a wide range of networks and includes appropriate hardware and software to communicatively couple to such networks. Examples of networks that can be configured to function with the handheld computing device 110 include personal area networks (e.g., Bluetooth), wireless networks (e.g., IEEE 802.11), and telecommunications networks (e.g., cellular or data). The one or more other I/O ports 255 include interfaces for connections such as universal serial bus (USB), IEEE 1394 (e.g., FireWire), and the like.

In addition, it is noted that the handheld computing device 110 is configured to use conventional operating systems such as Palm OS® from PalmSource™, Inc. or Windows CE or Windows Mobile from Microsoft® Corporation. It is noted that the device can also be configured for use with other operating systems, for example, Linux-based operating systems.

Optimizing a View of a Digital Image to Fill a Display Area on a Screen

Figure 3:
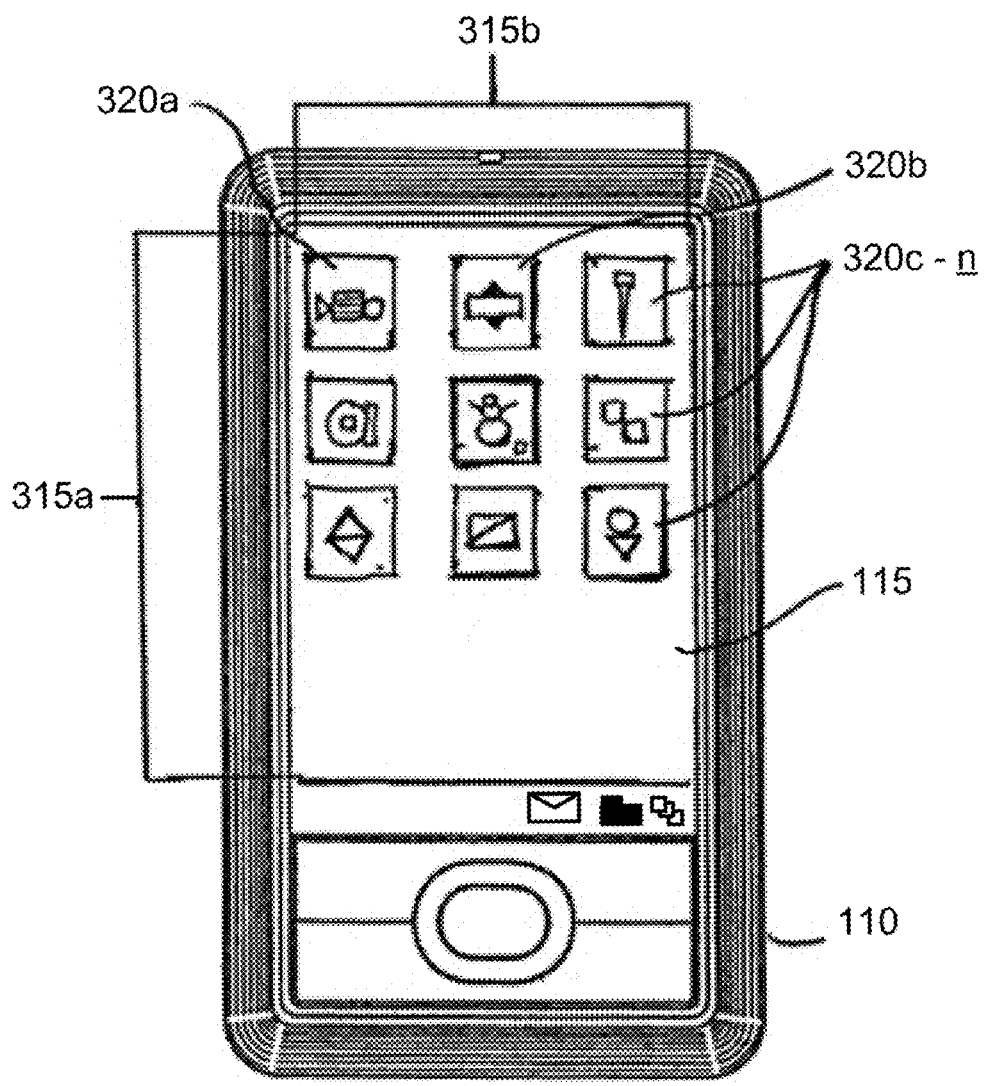
FIG. 3 illustrates one embodiment of digital image thumbnails viewed in a display area of a screen in accordance with the present invention.

Digital images may be previewed on the handheld computing device 110, in a thumbnail view. FIG. 3 illustrates one embodiment of digital image thumbnails 320a-320n (generally 320) viewed in a displayable area 315a by 315b (generally 315) of a screen in accordance with the present invention. Unlike conventional thumbnail views, this embodiment of the digital image thumbnails 320 displays the best fit of an image within a thumbnail size. The thumbnail does not scale the image to fit within the frame of the thumbnail, but rather the image is scaled to fill the thumbnail frame. The thumbnail also is respective of the user center and zooming positioning, such that the thumbnail represents the user's selected center point of the image (still or video). In one embodiment, the thumbnail images are rendered by taking the shortest (or smallest) dimension of the image and scaling it fit within the frame, which causes thumbnail frame to be filled with an image and without having to show black bars along edges of the thumbnail image.

From the digital images thumbnail, images can be selected for viewing "full screen," i.e., viewed so that the image expands to the complete displayable area of the screen 115, particularly when the displayable area 310 and/or the screen 115 are non-square aspect ratios (e.g., landscape or portrait configurations). FIG. 4 illustrates one embodiment of a process for optimizing a digital image to fill a display area of a screen in accordance with the present invention.

Figure 5D:
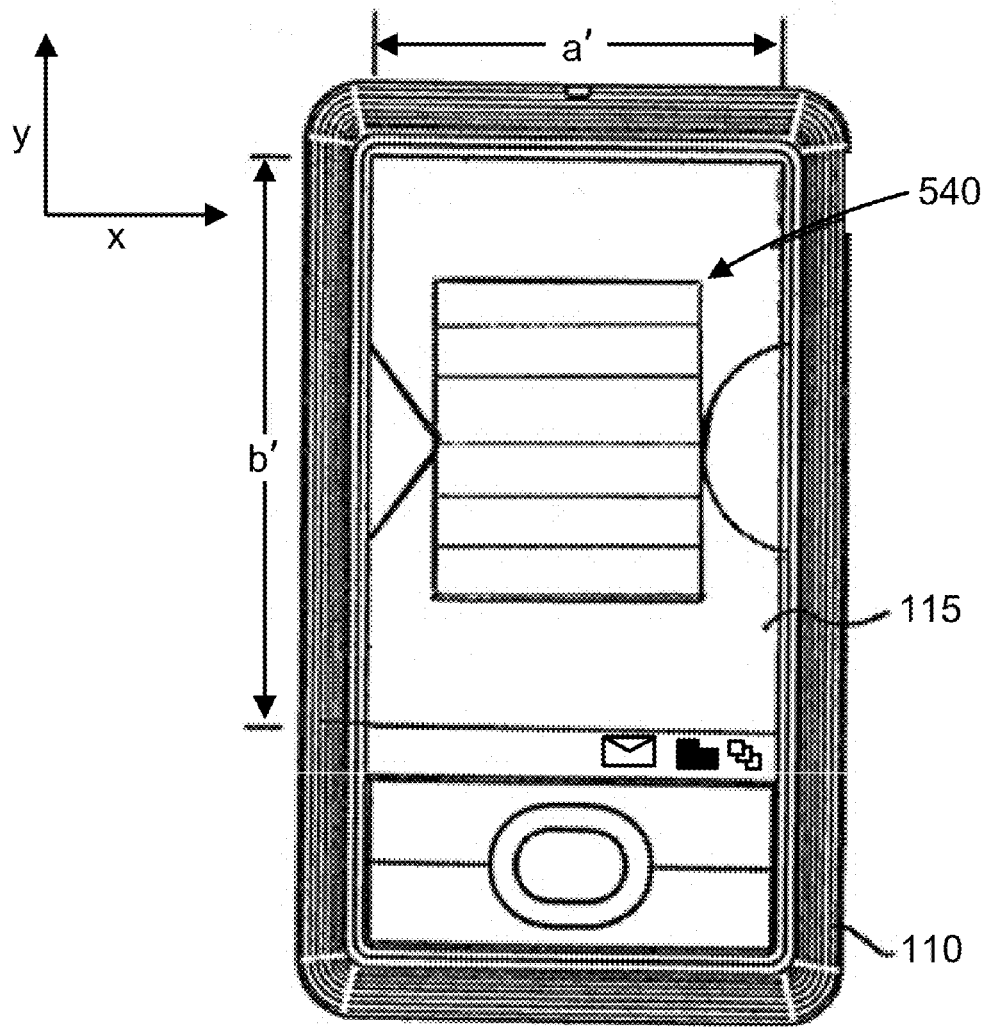

By way of example only, the process will be described with respect to a first digital image thumbnail 320a, which is shown as a photo in FIG. 5a and a digital image as illustrated in FIGS. 5b through 5d. FIG. 5d illustrates a view of the digital image at the completion of the process that is optimized to fill a display area of a screen in accordance with the present invention. Note that the photo illustrated in FIG. 5a is shown having a dimension of "a" in one direction and "b" in another direction, where "a" and "b" are numerical values that can include any width-length measurement value, e.g., inches, centimeters, pixels, etc.

When the photo or video is taken and captured, for example, on a digital medium such as a media card, it is a digital image (digital images in the case of video) 510. The digital image can be in any digital format, for example JPEG (still image) or MPEG (motion images, e.g., video). For ease of discussion and understanding will be considered to have proportional dimensions as the photo and shall also be referenced as "a" and "b", respectively. In this example, the digital image 510 (and the photo it originated from) is in a landscape configuration, i.e., the length in x-direction (or length in this example) greater than in y-direction (or width in this example) in a Cartesian coordinate system. More specifically, the example illustrated through FIG. 5a has dimensions of "a" in the x-direction and "b" in the y-direction, where "b" is less than, or shorter than, "a".

This digital image 510 would typically fit within a landscape oriented 520 displayable area of a screen as shown in FIG. 5b. However, for a portrait oriented (length in x-direction less than in y-direction in a Cartesian coordinate system) 530 displayable area as illustrated in FIG. 5c, the top and bottom of the screen would include "bars" 535a, 535b so that the landscape configuration of the digital image remains. An embodiment of the present invention rectifies this situation as further described herein.

Referring back to FIG. 4, the process starts 410 and identifies 415 a shortest dimension of the image in a relevant coordinate system. In one embodiment, a relevant coordinate system may be defined as a Cartesian coordinate system in which a plane of photo is defined through an x-direction and a y-direction. Next, the process identifies 420 a resolution of the displayable area of the screen. The resolution of the displayable area of the screen may be determined by the number of pixels or dots per inch and may be noted, for example, as 1024 (width) by 728 (height) or 480 (width) by 640 (height). The process then scales 425 the shortest dimension of the digital image to fit the shortest dimension of the displayable area of the screen, relative to its orientation.

Specifically, the shortest (or smallest) dimension of the image will be scaled to fit the width or height of the screen 115 on the handheld computing device 110 relative to its orientation. The rest of the image is then proportionately scaled to fill the remainder of the displayable area of the screen. The result is that the screen 115 on the handheld computing device shows a full screen of content (digital image-still or motion).

As an example, reference is made to FIG. 5d which illustrates how the original landscape digital image 510 has been scaled up to fit as an image 540 within the portrait oriented displayable area (a'<b') on the screen 115 of the handheld computing device 110. Although the image is enlarged, it can be manipulated (e.g., moved around, rotated, etc.), for example, as further described below. At this point the process can end 435 or optionally can receive additional instructions to further manipulate (e.g., copy, crop, shade, color, etc.) the fully fitted image.

In one embodiment, the process described (via FIGS. 4 and 5a-5d) is configured for operation as software (or a computer-implemented program product). The software can be stored as instructions in a memory 230 or on a storage device (e.g., hard disk, Compact Disc, DVD, flash drive, etc.) 225 and can be executable by the processor 220. The instructions (e.g., steps) of the process may also be configured as one or more modules configured to perform the function or functions described. In addition, the process can also be embodied in firmware or hardware.

An advantage of the system and process described herein is that it maximizes viewability of a digital image within a displayable area on a screen. The digital image is not a limited by the non-square aspects of the screen for devices such as the handheld computing device 110, because the screen 115 can be easily rotated in a hand of the user so that the picture is appropriately viewed in the proper viewing configuration when "rotated" on the screen 115. For example, a landscape digital image rotated on the portrait screen configuration to fit the entire displayable area of the screen 115 by rotating 90 degrees so that when the handheld computing device is rotated 90 degrees in a user's hand, it provides a landscape view of the digital image 510 in the displayable area of the screen 115.

Saving a Re-Positioned View of a Digital Image

Figure 8:
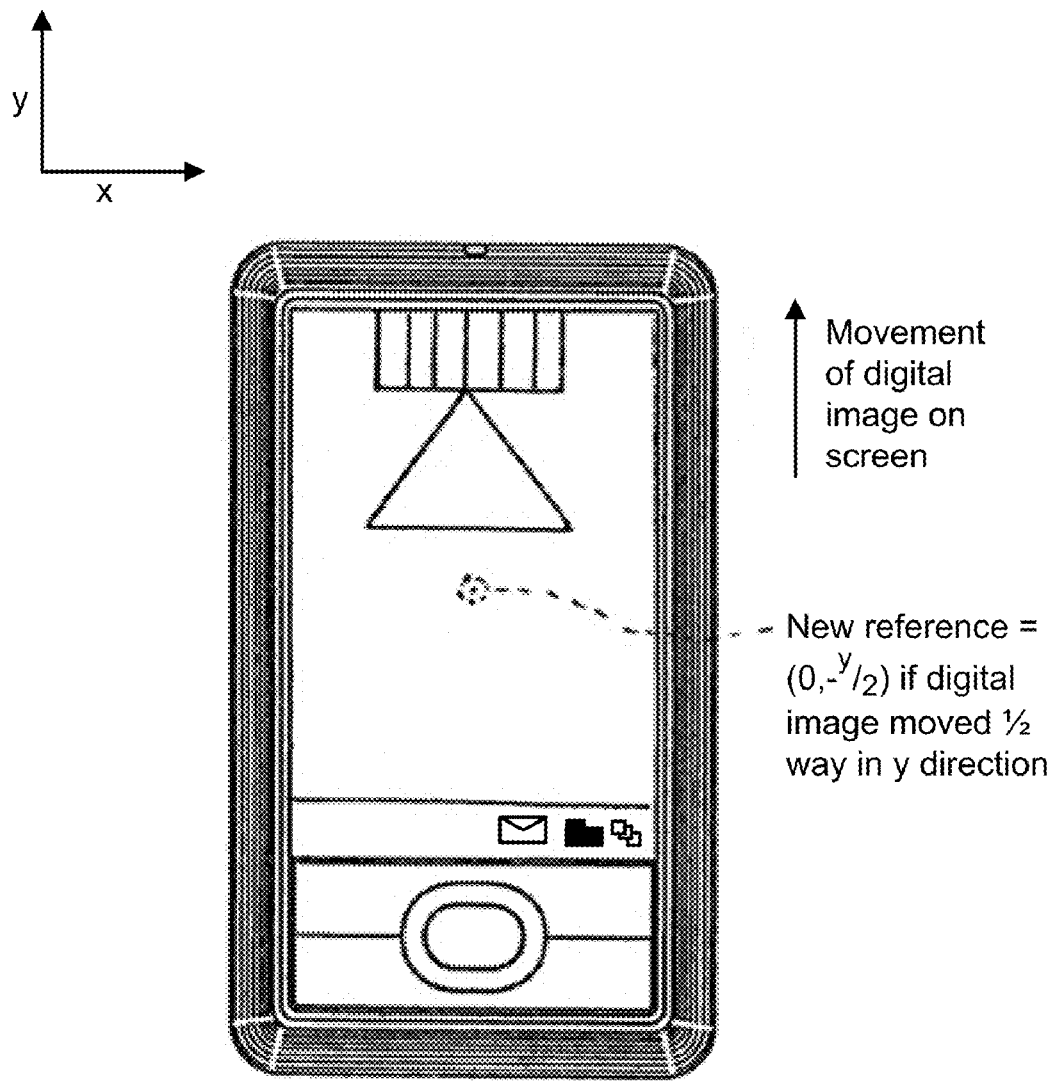
FIG. 8 illustrates one embodiment of a digital image in a re-positioned (or second) view that is stored for later retrieval in the re-positioned view in accordance with the present invention.

When a digital image is viewed, for example, after rotation, and re-positioned in the screen, a user may desire to save the re-positioned view so that this particular view is later retrievable rather than the original view. FIG. 6 illustrates one embodiment of a process for saving a re-positioned view (e.g., a new or second view) of a digital image for later retrieval of that view in accordance with the present invention. To help understand how the process works, reference is also made to the example digital images illustrated in FIG. 5d and FIG. 8. FIG. 8 illustrates one embodiment of the digital image in a re-positioned (or second) view that is stored for later retrieval in the re-positioned view in accordance with the present invention.

Figure 7:
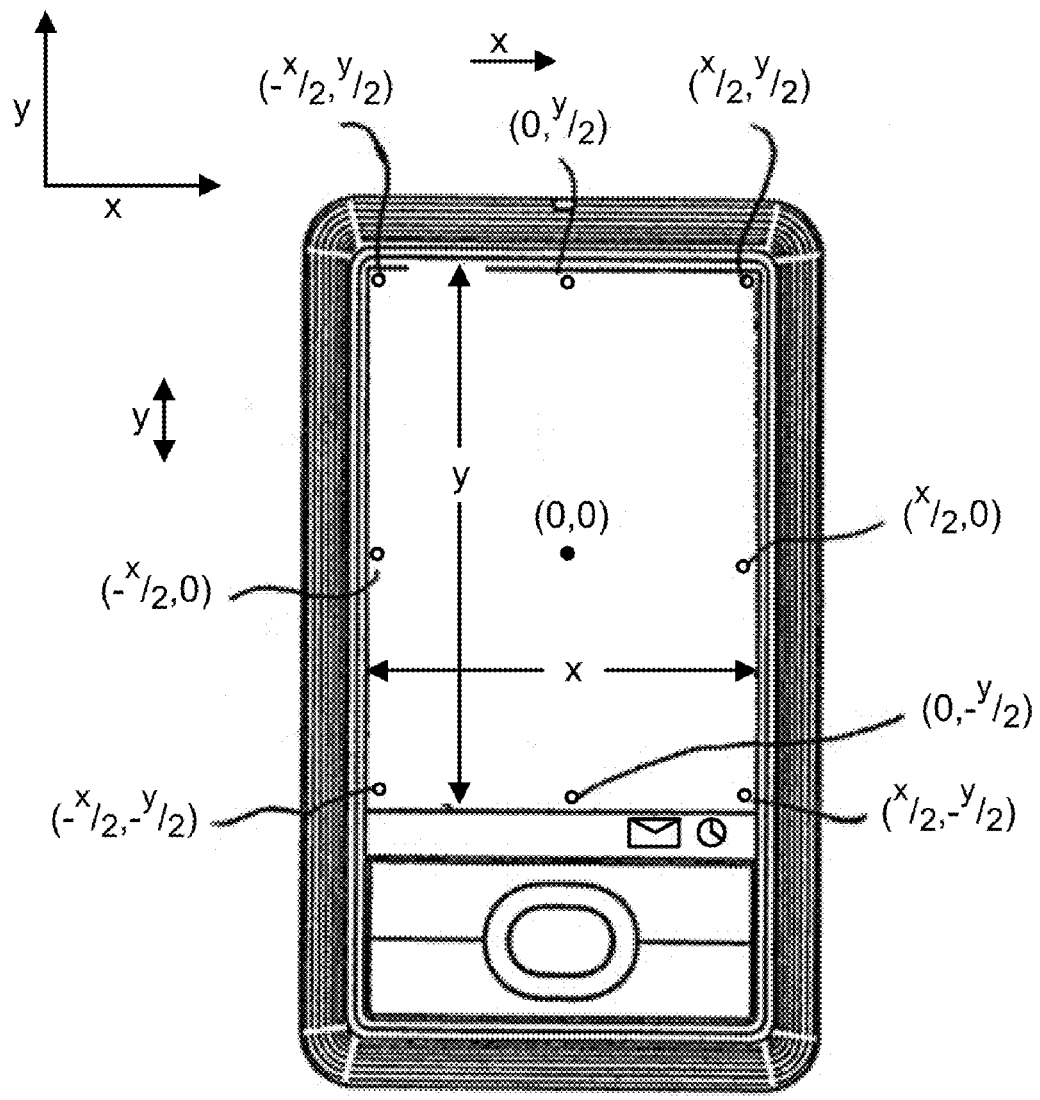
FIG. 7 illustrates one embodiment of a coordinate system used with a displayable area of a screen in accordance with the present invention.

The process starts 610 and identifies 615 a coordinate system for use in tracking the digital image in the displayable area of the screen 115. FIG. 7 illustrates an example embodiment of a coordinate system used with a displayable area of the screen 115 of the handheld computing system 110 in accordance with the present invention. The points in this example correspond with a Cartesian coordinate system such as an x-y coordinate system for two dimensional images. The displayable area of the screen 115 is then logically configured so that a reference point is in the middle at a location $\{x, y=0, 0\}$. From this reference point, other points on the displayable area of the screen 115 can be identified for a screen that has dimensions of "x" in one direction and "y" in another direction, as is shown in FIG. 7. Note that in alternative embodiments, the coordinate system may be a Cartesian coordinate system such as an x-y-z coordinate system for three dimensional images.

In the context of the example the digital image illustrated in FIG. 5d, the center of the displayable area in which the digital image is located on the screen 115 will be considered to have an initial reference point of $\{x, y=0, 0\}$. Now, referring back to FIG. 6, the process receives instructions for manipulation 620 of the digital image relative to the coordinate system in use. In the present example, manipulation of the digital image in FIG. 5d includes moving the image in a positive y-direction (relative to the coordinate system in FIG. 7) so that the digital image is now positioned as illustrated in FIG. 8.

Turning back to FIG. 6, the process saves 625 the location coordinates of the re-positioned digital image relative to the coordinate system in use. In particular, in one embodiment the process saves a new value for the reference point. In the example of the digital images in FIG. 5d and FIG. 8, the reference point is the center of the displayable area on the screen 115. When the digital image is moved ½ length in the y-direction on the screen, the reference point value changes from $\{x, y=0, 0\}$ to $\{x, y=0, -y/2\}$, which is saved as the new reference point of the re-positioned image. It is noted that alternatively, the system and process can be configured to reference points on the screen using pixel offsets.

The process continues with linking 630 the location coordinates of this new reference point with the digital image before the process ends 635. It is noted that the new reference point can be saved in 'Exif', which is embedded with a JPEG file, or in a separate file altogether that is associated with the digital image. Subsequently, when a user or computer program seeks to retrieve the digital image from storage, the 'Exif' information or the separate file (depending on where the data is stored) is reviewed to determine the reference point from which to display the image. With the $\{x, y=0, -y/2\}$ coordinates stored in the file, the system displays on the screen 115 the image illustrated in FIG. 8 rather than the image illustrated in FIG. 5d.

It is noted that one embodiment of the present invention is configured to take into account that digital images (including video) oriented as portrait or landscape save separate offset settings. For example, in a portrait orientation, a center point used as the reference point in a digital image is different than a center point used as a reference point in a landscape orientation. In an embodiment, portrait and landscape modes are defined by the device orientation (e.g., how the device is configured to display images for a user). Further, an embodiment allows for switching between portrait and landscape orientations on a display screen of a device using a physical switch on the device or a soft switch provided through a software configuration.

In one embodiment, the process described (via FIGS. 5d through 8) is configured for operation as software (or a computer-implemented program product). The software can be stored as instructions in a memory 230 or on a storage device (e.g., hard disk, Compact Disc, DVD, flash drive, etc.) 225 and can be executable by the processor 220. The instructions (e.g., steps) of the process may also be configured as one or more modules configured to perform the function or functions described. In addition, the process can also be embodied in firmware or hardware.

The system and process described beneficially allows manipulation actions performed on a digital image to be associated and saved with that image. When the image is later recalled, the saved image is displayed as the image was last viewed on the screen.

As an example, in a slideshow context, if an image is to be seen shifted relative to the displayable area of the screen reference, the original image view can be shifted to the appropriate re-positioned location on screen and the coordinate of this re-positioned view is saved with the 'Exif' information or separate file associated with the digital image. When the slideshow is operational, the re-positioned view of the image is what is displayed rather than the original position of the image. The image is the same image and not a copy of the image so that there is no extra image storage consumed to have the re-positioned view. Manipulation of the image in this context is done without the need for external or dedicated software required to re-position and re-save the image as a new image.

Transitioning Between Images in a Slideshow Using Sound Annotations

Digital images captured and stored on a storage medium, e.g., the storage device 225 of the handheld computing device 110, are well suited for slideshows for example, as noted above. In one embodiment, a slideshow includes two or more digital images in which there transition between each digital image. The digital images are typically still images, although some embodiments may incorporate some video type images with the still images. The transition between images is either manual, e.g., a user manually selecting the next slide for viewing, or preset to transition from one image to the next, e.g., a timer that may be set by a user to transition every 5 seconds, 10 seconds, 60 seconds, or some other predetermined time limit.

In conventional systems, when the slideshow is annotated, for example, by sound, the slideshow creator must estimate the amount of time required for transition between images and uniformly apply the greatest time required to all transitions. To address this, FIGS. 9, 9b, and 10 illustrate examples embodiments of configurations that allow for sound annotation of digital images followed by how transitions can be handled in a slideshow relative to those annotations.

Figure 9B:
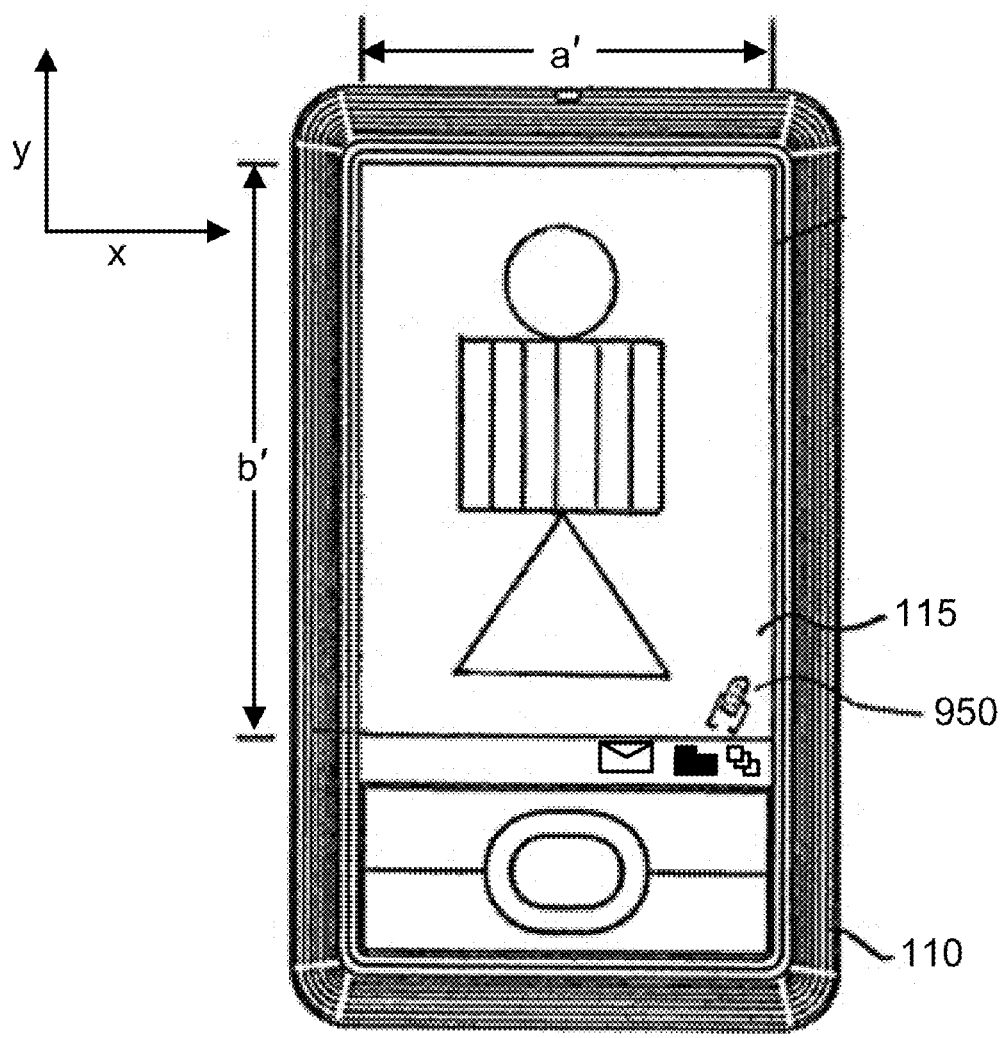

FIGS. 9a and 9b illustrate one embodiment of a process for annotating a digital image with a sound annotation. The process starts 910 and the user (or program) selects 915 an image to which a sound, e.g., voice, annotation will be included. The process may include an optional mechanism to select 920, for example, in a menu or icon associated with a sound annotation program. The process records 925 a sound annotation that captures (or records) and stores, e.g., on the storage device 225, a sound, e.g., a sound bite or voice. The process links 930 the recorded sound annotation with a particular digital image. The process also associates 935 a sound icon with the image and/or with a thumbnail of the image. An example of a sound icon (e.g., a voice icon) 950 illustrated on the screen 115 as associated with the image is illustrated in FIG. 9b.

FIG. 10 illustrates one embodiment of a process for transitioning between digital images in a slide show using a sound annotation to transition the digital image. The process starts 1010 and generally has some preset 1015 duration for transitions between one or more images in the slideshow. The preset duration may be set by a user or a program. When the slideshow starts, the process shows 1020 the first slide. The process determines 1025 if there is a sound (e.g., voice) annotation (or sound clip) associated with the image (or "slide") being shown. If there is no sound annotation the process continues with showing 1020 the next image (or "slide") or it can end 1050 if no more images are in the slideshow.

If there is a sound annotation, the process changes 1030 the time period of the transition for the present image having the sound annotation to be at least equal to the time period of the sound annotation. The process shows 1035 the image for this time period. Hence, the length of time the image is shown directly corresponds with the length of time of the sound annotation associated with it. Note that the time period of the sound annotation can be determined by a variety of factors, for example, a pure function of time in terms of how long it takes to play the sound annotation or it can be a size of the file in which a particular size corresponds with an approximate length to play the sound annotation. Once the image is shown, the process can (optionally) reset 1040 the transition back to the original preset time. The process then determines 1045 if this is the end of the images in the slideshow before ending 1050 or continuing to the next image in the slideshow.

It is noted that the sound annotation can be a previously recorded sound file or can be a newly recorded sound file e.g., a voice annotation recorded through the audio subsystem 245 of the handheld computing device 110. The sound annotation can be in mp3 format, mp4 format, windows media (.wma) format, real media (.rm) format, or the like. In one embodiment, the process described (via FIGS. 9a, 9b, and 10) is configured for operation as software (or a computer-implemented program product). The software can be stored as instructions in a memory 230 or on a storage device (e.g., hard disk, Compact Disc, DVD, flash drive, etc.) 225 and can be executable by the processor 220. The instructions (e.g., steps) of the process may also be configured as one or more modules configured to perform the function or functions described. In addition, the process can also be embodied in firmware or hardware.

The system and process described herein beneficially allows for altering transition time between images in a slideshow when a digital image includes an associated sound annotation. This provides increased presentation flexibility for a user or program undertaking a slideshow presentation.

It is noted that although the disclosure herein makes references in some embodiments to interaction between a personal computer and handheld computing device, the principles disclosed herein are applicable to any configuration in which two computing devices are communicatively coupled. For example, in some embodiments there may be communications between a first computing device and a second computing device wherein the first device can be any computing type device (e.g., a server computer system, a desktop computer, a laptop computer, a personal digital assistant, a gaming device, a smart phone, etc.) or a portable computing system) and the second device can be any computing device (e.g., also a server computer system, a desktop computer, a laptop computer, a personal digital assistant, a gaming device, a smart phone, etc), of which one device may be a host and the other a client or the devices may be peers (e.g., peer to peer connection).

Upon reading this disclosure, those of skill in the art will appreciate still additional alternative structural and functional designs for a system and a process to, inter alia, optimally viewing digital images on a non-square display area of a screen, saving the digital image in a re-positioned location on the screen without having to create a new image file, and/or annotating the image with sound and transitioning between images in a slideshow based on the duration of the sound annotation, through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for viewing and storing an image, the method being performed by a processor of a computing device and comprising:

identifying a coordinate system for a viewable area of a display of the computing device;

retrieving an image file for the image for display within the viewable area;

displaying, at a first position, a first portion of the image in the viewable area, the first position corresponding to the image having the first portion displayed within the viewable area and at least a second portion being out of the viewable area, the first position corresponding to a first reference point within the coordinate system;

moving the image to a second position to display a third portion of the image in the viewable area, the second position corresponding to the image having the third portion displayed within the viewable area and at least a fourth portion being out of the viewable area and corresponding to a second reference point within the coordinate system, the image file being unaltered between the first position and the second position;

storing coordinates of the second reference point in a memory resource; and subsequently retrieving and providing for display the image in the second position based on the stored coordinates of the second reference point.

2. The method of claim 1, wherein storing the coordinates of the second reference point includes linking the coordinates of the second reference point with the image file.

3. The method of claim 1, further comprising displaying the image in the second position in response to retrieval of the stored coordinates of the second reference point.

4. The method of claim 1, wherein the first reference point is a center of the viewable area in the first position and the second reference point is a center of the viewable area in the second position.

5. The method of claim 1, wherein the image file is retrieved from a remote storage.

6. A non-transitory computer readable storage medium storing instructions thereon, the instructions, when executed by a processor cause the processor to:

identify a coordinate system for a viewable area of a display of a computing device;

retrieve an image file for the image for display within the viewable area;

display, at a first position, a first portion of the image in the viewable area, the first position corresponding to the image having the first portion displayed within the viewable area and at least a second portion being out of the viewable area, the first position corresponding to a first reference point within the coordinate system;

move the image to a second position to display a third portion of the image in the viewable area, the second position corresponding to the image having the third portion displayed within the viewable area and at least a fourth portion being out of the viewable area and corresponding to a second reference point within the coordinate system, the image file being unaltered between the first position and the second position;

store coordinates of the second reference point in a memory resource; and subsequently retrieve and provide for display the image in the second position based on the stored coordinates of the second reference point.

7. The computer readable storage medium of claim 6, wherein the instruction further comprise instructions that when executed by the processor cause the processor to store the coordinates of the second reference point by linking the coordinates of the second reference point with the image file.

8. The computer readable storage medium of claim 6, wherein the instructions further comprise instructions that when executed by the processor cause the processor to display the image in the second position in response to retrieval of the stored coordinates of the second reference point.

9. The computer readable storage medium of claim 6, wherein the first reference point is a center of a viewable area in the first position and the second reference point is a center of the viewable area in the second position.

10. The computer readable storage medium of claim 6, wherein the instructions further comprise instructions that when executed by the processor cause the processor to receive the image from a remote storage.

11. A computing device comprising:
a display;
a memory resource; and
a processor coupled to the display and the memory resource, the processor being configured to:
identify a coordinate system for a viewable area of the display;
retrieve an image file for the image for display within the viewable area;
display, at a first position, a first portion of the image in the viewable area, the first position corresponding to the image having the first portion displayed within the viewable area and at least a second portion being out of the viewable area, the first position corresponding to a first reference point within the coordinate system;
move the image to a second position to display a third portion of the image in the viewable area, the second position corresponding to the image having the third portion displayed within the viewable area and at least a fourth portion being out of the viewable area and corresponding to a second reference point within the coordinate system, the image file being unaltered between the first position and the second position;
storing coordinates of the second reference point in the memory resource; and
subsequently retrieving and providing for display the image in the second position based on the stored coordinates of the second reference point.

12. The computing device of claim 11, wherein the processor is configured to store the coordinates of the second reference point by linking the coordinates of the second reference point with the image file.

13. The computing device of claim 11, wherein the processor is further configured to display the image in the second position in response to retrieval of the stored coordinates of the second reference point.

14. The computing device of claim 11, wherein the first reference point is a center of the viewable area in the first position and the second reference point is a center of the viewable area in the second position.

15. The computing device of claim 11, wherein processor is configured to retrieve the image file from a remote storage.

* * * * *